United States Patent
Um et al.

[11] Patent Number: 5,877,889
[45] Date of Patent: Mar. 2, 1999

[54] METHOD FOR THE MANUFACTURE OF A THIN FILM ACTUATED MIRROR ARRAY

[75] Inventors: Min-Sik Um; Myung-Kwon Koo, both of Seoul, Rep. of Korea

[73] Assignee: Daewoo Electronics Co., Ltd., Seoul, Rep. of Korea

[21] Appl. No.: 918,870

[22] Filed: Aug. 26, 1997

[30] Foreign Application Priority Data

Aug. 30, 1996 [KR] Rep. of Korea ....................... 96-36962
Sep. 25, 1996 [KR] Rep. of Korea ....................... 96-42758

[51] Int. Cl.⁶ ........................... G02B 26/00; G02B 26/08; G02B 5/08
[52] U.S. Cl. ........................... 359/295; 359/223; 359/850
[58] Field of Search .................... 359/223, 224, 359/290, 291, 295, 850

[56] References Cited

U.S. PATENT DOCUMENTS 5,682,260 10/1997 Jeon ......................................... 359/224
5,789,264 8/1998 Chung ....................................... 437/40

FOREIGN PATENT DOCUMENTS 2304918 3/1997 United Kingdom .

Primary Examiner—Georgia Epps
Assistant Examiner—John Woolner
Attorney, Agent, or Firm—Anderson, Kill & Olick, P.C.

[57] ABSTRACT

An inventive method for the manufacture of an array of M×N thin film actuated mirrors for use in an optical projection system includes the steps of: providing an active matrix; depositing a thin film sacrificial layer; depositing a protective oxidation layer on top of the thin film sacrificial layer; creating an array of empty cavities; depositing an elastic layer; forming an array of conduits in the elastic layer; depositing a second thin film, a thin film electrodisplacive and a first thin film layers, successively, thereby forming a multiple layer structure; patterning the multiple layer structure, until the thin film sacrificial layer is exposed; and removing the thin film sacrificial layer to thereby form an array of M×N thin film actuated mirrors. The protective oxidation layer is deposited on top of the thin film sacrificial layer before the formation of each of the empty cavities, which, in turn, prevents phosphorus on the surface of thin film sacrificial layer from getting oxidized.

9 Claims, 8 Drawing Sheets

METHOD FOR THE MANUFACTURE OF A THIN FILM ACTUATED MIRROR ARRAY

FIELD OF THE INVENTION

The present invention relates to an array of M×N thin film actuated mirrors for use in an optical projection system; and, more particularly, to a method for preventing a thin film sacrificial layer from the getting oxidized during the manufacture thereof.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1F, there are illustrated manufacturing steps involved in manufacturing an array 100 of M×N thin film actuated mirrors 101, wherein M and N are integers, disclosed in a copending commonly owned application, U.S. Ser. No. 08/589,478, entitled "METHOD FOR FORMING A THIN FILM ACTUATED MIRROR ARRAY".

The process for the manufacture of the array 100 begins with the preparation of an active matrix 110 including a substrate 112 with an array of M×N connecting terminals 114 and an array of M×N transistors(not shown), wherein each of the connecting terminals 114 is electrically connected to a corresponding transistor in the array of transistors.

In a subsequent step, a thin film sacrificial layer 120, made of phosphor-silicate glass (PSG), and having a thickness of 0.1–2 $\mu$m, is formed on top of the active matrix 110 by using a chemical vapor deposition(CVD) method or a spin coating method.

Thereafter, there is formed an array of M×N pairs of empty cavities (not shown) in the thin film sacrificial layer 120 by using an wet etching method. One of the empty cavities in each pair encompasses one of conduits 126.

Subsequently, an elastic layer 130, made of an insulating material, e.g., silicon nitride, and having a thickness of 0.1–2 $\mu$m, is deposited on top of the thin film sacrificial layer 120 including the empty cavities by using a CVD method.

Thereafter, there is formed in the elastic layer 130 an array of M×N conduits 126 made of a metal, e.g., tungsten(W). Each of the conduits 126 is formed by: first creating an array of M×N holes(not shown), each of the holes extending from top of the elastic layer 130 to top of a corresponding connecting terminal 114 by using an etching method; and filling therein with the metal by using, e.g., a lift-off method, as shown in FIG. 1A.

Then, a second thin film layer 140, made of an electrically conducting material, e.g., aluminum(Al), and having a thickness of 0.1–2 $\mu$m, is formed on top of the elastic layer 130 including the conduits 126 by using a sputtering or a vacuum evaporation method.

Next, a thin film electrodisplacive layer 150, made of a piezoelectric material, e.g., lead zirconium titanate(PZT), or an electrostrictive material, e.g., lead magnesium niobate (PMN), and having a thickness of 0.1–2 $\mu$m, is formed on top of the second thin film layer 140 by using a CVD method, an evaporation method, a Sol-Gel method or a sputtering method.

In an ensuing step, a first thin film layer 160, made of an electrically conducting and light reflecting material, e.g., aluminum(Al) or silver(Ag), and having a thickness of 0.1–2 $\mu$m, is formed on top of the thin film electrodisplacive layer 150 by using a sputtering or a vacuum evaporation method, as shown in FIG. 1B.

After the above step, the first thin film 160, the thin film electrodisplacive 150, the second thin film 140 and the elastic layers 130 are patterned into an array of M×N first thin film electrodes 165, an array of M×N thin film electrodisplacive members 155, an array of M×N second thin film electrodes 145 and an array of M×N elastic members 135 by using a photolithography or a laser trimming method, thereby forming an array 180 of M×N actuated mirror structures 181, as shown in FIG. 1C. Each of the second thin film electrodes 145 is electrically connected to a corresponding connecting terminal 114 through the conduit 126, thereby functioning as a signal electrode in each of the thin film actuated mirrors 101. Each of the first thin film electrodes 165 functions as a mirror as well as a bias electrode therein.

The preceeding step is then followed by completely covering the top surface and the side surfaces in each of the actuated mirror structures 181 with a thin film protection layer 170, as shown in FIG. 1D.

The thin film sacrificial layer 120 is then removed by using an etchant, e.g., hydrogen fluoride(HF), as shown in FIG. 1E.

Finally, the thin film protection layer 170 is removed by using an etching method, e.g., a plasma etching method thereby forming the array 100 of M×N thin film actuated mirrors 101, as shown in FIG. 1F.

There are certain deficiencies associated with the above described method for manufacturing the array 100 of M×N thin film actuated mirrors 101. Since the thin film sacrificial layer 120 is made of a phosphor-silicate glass (PSG), during the formation of empty cavities by using an wet etching method, phosphorus on the surface of thin film sacrificial layer 120 are oxidized into phosphorus pentoxides ($P_2O_5$) decreasing the adhensivity between the thin film sacrificial layer 120 and a photoresist used in the wet etching method, in such a way that the thin film sacrificial layer 120 located under the unexposed portions of the photoresist may get wrongfully removed.

Furthermore, the phosphorus pentoxides ($P_2O_5$) formed on the surface of the thin film sacrificial layer 120 may react with moisture to form phosphoric acid ($H_3PO_4$), damaging the thin film sacrificial layer.

SUMMARY OF THE INVENTION

It is, therefore, a primary object of the present invention to provide an array of M×N thin film actuated mirrors for use in an optical projection system, each of the thin film actuated mirrors capable of prevent a thin film sacrificial layer from getting oxidation.

It is another object of the present invention to provide a method for the manufacture of such an array of M×N thin film actuated mirrors.

In accordance with one aspect of the present invention, there is provided an array of M×N thin film actuated mirrors, wherein M and N are integers, for use in an optical projection system, the array comprising:

an active matrix including a substrate and an array of M×N connecting terminals;

a passivation layer formed on top of the active matrix;

an etchant stopping layer formed on top of the passivation layer; and an array of M×N actuated mirror structures, each of the actuated mirror structures including a first thin film electrode, a thin film electrodisplacive member, a second thin film electrode, an elastic member and a protective oxidation member, the thin film electrodisplacive member being located between the two electrodes, the protective oxidation member being located under the elastic member wherein each of the second thin film electrodes is electrically connected to a corresponding connecting terminal through a conduit, thereby functioning as a signal electrode in each of the thin film actuated mirrors and each of the first thin film electrodes functions as a mirror as well as a bias electrode therein.

In accordance with another aspect of the present invention, there is provided a method for the manufacture of an array of M×N thin film actuated mirrors, wherein M and N are integers, for use in an optical projection system, the method comprising the steps of: providing an active matrix including a substrate and an array of M×N connecting terminals; forming a passivation layer and an etchant stopping layer on top of the active matrix, respectively; depositing a thin film sacrificial layer on top of the etchant stopping layer; depositing a protective oxidation layer on top of the thin film sacrificial layer; creating an array of M×N empty cavities in thin film sacrificial layer, one of the empty cavities in each pair encompassing one of the connecting terminals; depositing an elastic layer on top of the protective oxidation layer including the empty cavities; forming an array of M×N conduits in the elastic layer, each of the conduits extending from top of the elastic layer to top of the corresponding connecting terminal; depositing a second thin film, a thin film electrodisplacive and a first thin film layers, successively, on top of the elastic layer to thereby form a multiple layered structure; patterning the multiple layered structure into an array of M×N actuated mirror structures until the thin film sacrificial layer is exposed, each of actuated mirror structures including a first thin film electrode, a thin film electrodisplacive member, a second thin film electrode, a elastic member and a protective oxidation member, respectively; and removing the thin film sacrificial layer thereby forming the array of M×N thin film actuated mirrors.

BRIEF DESCRIPTION OF THE DRAWINGS

The above and other objects and features of the present invention will become apparent from the following description of the preferred embodiments, when given in conjunction with the accompanying drawings, wherein.

DETAILED DESCRIPTION OF THE PREFERRED EMBODIMENTS

Figure 1A:
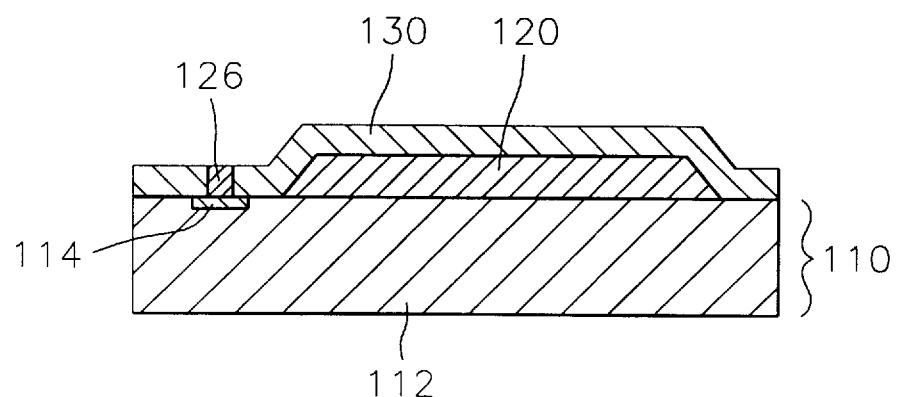
FIGS. 1A to 1F are schematic cross sectional views illustrating a method for the manufacture of an array of M×N thin film actuated mirrors previously disclosed.
Figure 1B:
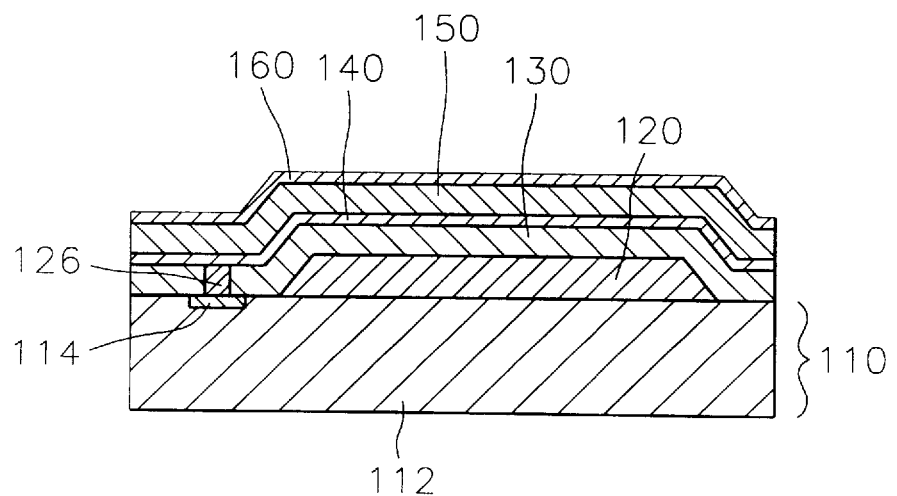
Figure 1C:
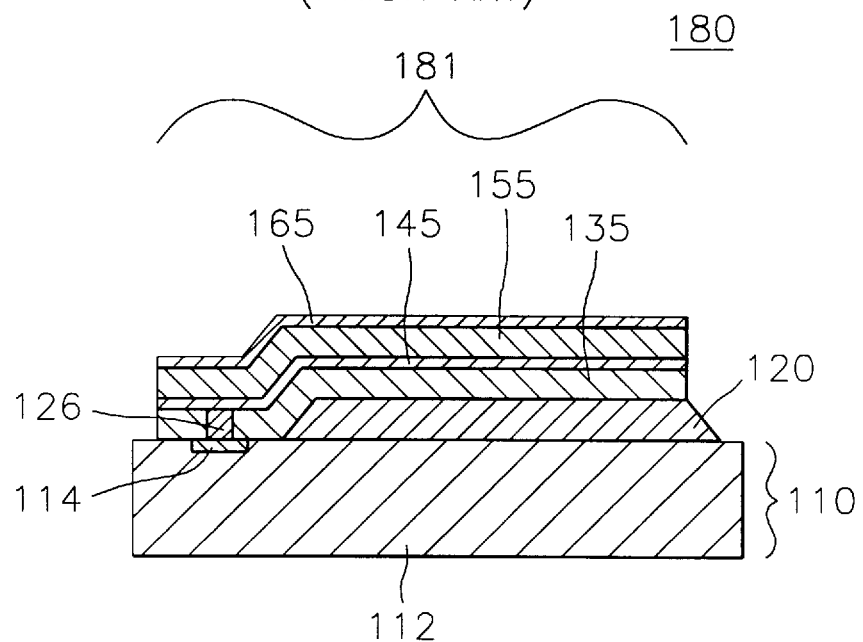
Figure 1D:
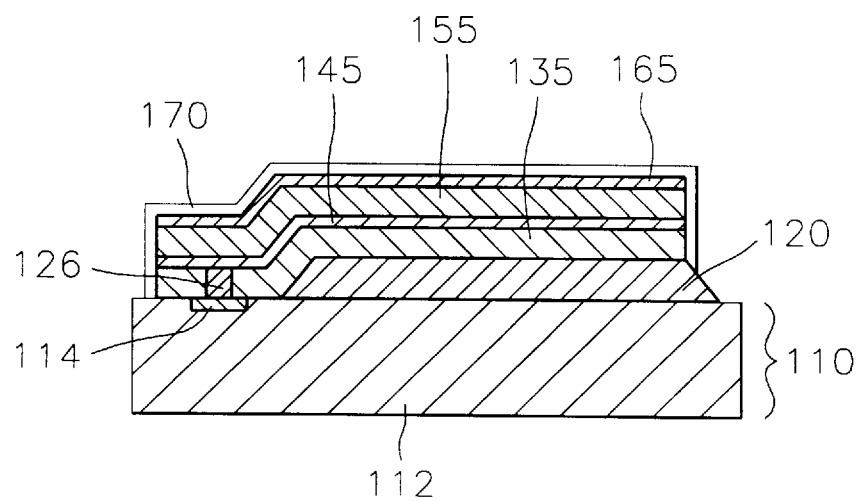
Figure 1E:
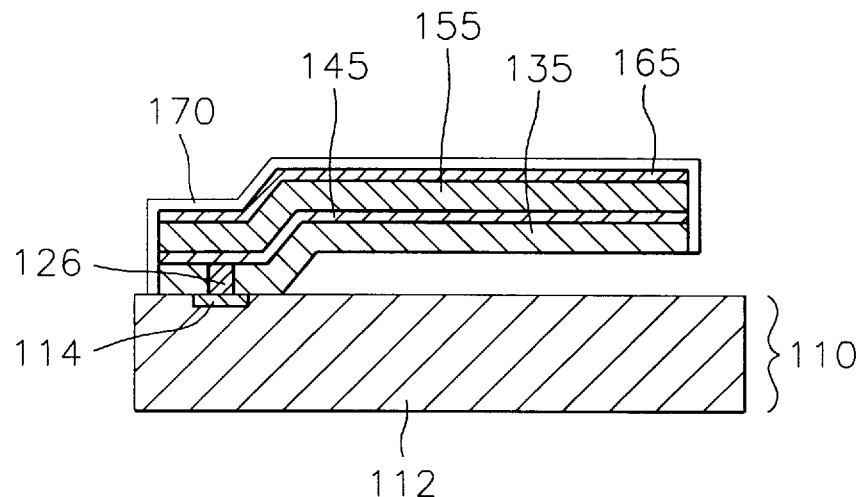
Figure 1F:
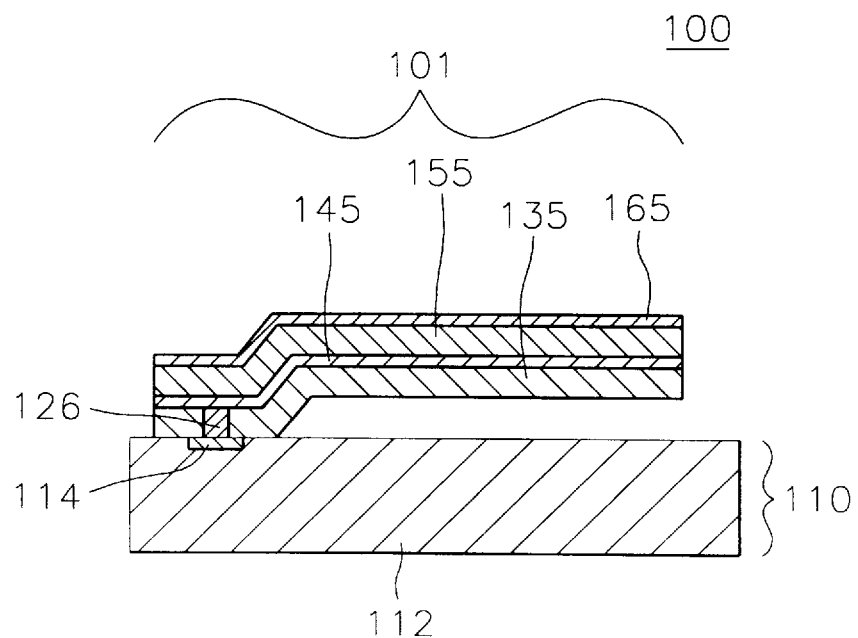

There are provided in FIGS. 2 and 3A to 3H schematic cross sectional views setting forth an array 300 of M×N thin film actuated mirrors 301 and a method for the manufacture thereof, respectively, wherein M and n are integers, for use in an optical projection system, in accordance with the present invention. It should be noted that like parts appearing in FIGS. 2 and 3A to 3H are represented by like reference numerals.

Figure 2:
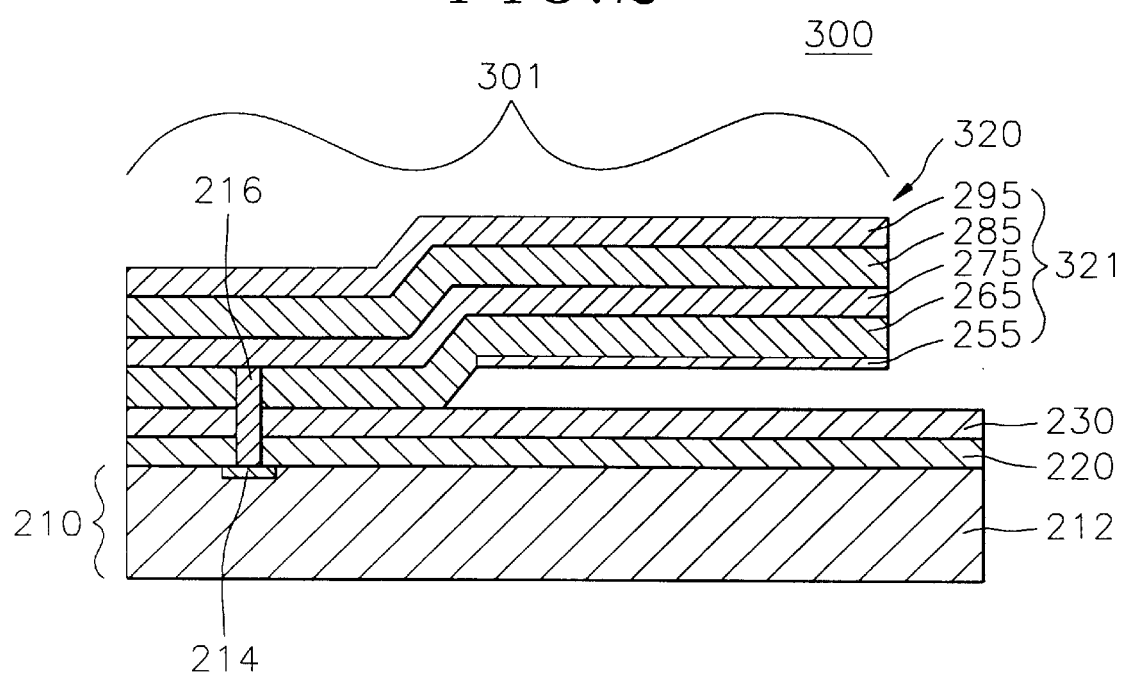
FIG. 2 is a cross sectional views setting forth an array of M×N thin film actuated mirrors for use in an optical projection system in accordance with the present invention.

In FIG. 2, there is produced a cross sectional view of an array 300 of M×N thin film actuated mirrors 301 in accordance with the present invention, the array 300 comprising an active matrix 210, a passivation layer 220, an etchant stopping layer 230 and an array 320 of M×N actuated mirror structures 321.

The active matrix 210 has a substrate 212 and an array of M×N transistor (not shown) and an array of M×N connecting terminals 214, each of connecting terminals 214 is electrically connected to a corresponding transistor in the array of M×N transistors.

The passivation layer 220, made of, e.g., phosphor-silicate glass (PSG) or silicon nitride, and having a thickness of 0.1–2 μm, is located on top of the active matrix 210.

The etchant stopping layer 230, made of a nitride, and having a thickness of 0.1–2 μm, is positioned on top of the passivation layer 220.

Each of the actuated mirror structures 321 includes a first thin film electrode 295, a thin film electrodisplacive member 285, a second thin film electrode 275, an elastic member 265 and a protective oxidation member 255, the thin film electrodisplacive member 285 being located between the two electrodes 295, 275, the protective oxidation member 255 being located under the elastic member 265. Each of the second thin film electrodes 275 is electrically connected to a corresponding connecting terminal 214 through a conduit 216, thereby functioning as a signal electrode in each of the thin film actuated mirrors 301 and each of the first thin film electrodes 295 functions as a mirror as well as a bias electrode therein.

In FIGS. 3A to 3H, there are presented cross sectional views setting forth a method for manufacturing an array 300 of M×N thin film actuated mirrors 301 in accordance with a preferred embodiment of the present invention.

The process for the manufacture of the array 300 begins with the preparation of an active matrix 210 including a substrate 212 with an array of M×N connecting terminals 214 and an array of M×N transistors(not shown).

In a subsequent step, a passivation layer 220, made of, e.g., a phosphor-silicate glass (PSG) or silicon nitride, and having a thickness of 0.1–2 μm, is deposited on top of the active matrix 210 by using a chemical vapor deposition (CVD) method or a spin coating method.

Figure 3A:
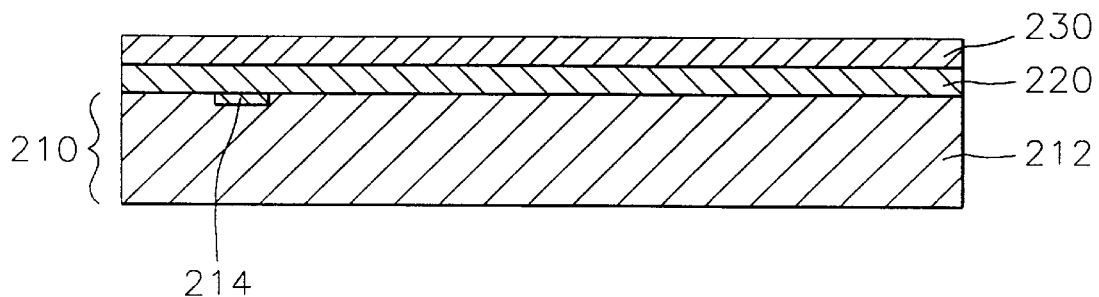
FIGS. 3A to 3H are schematic cross sectional views illustrating a method for the manufacture of an array of M×N thin film actuated mirrors in accordance with the present invention.

Next, an etchant stopping layer 230, made of a nitride, and having a thickness of 0.1–2 μm, is deposited on top of the passivation layer 220 by using, e.g., a sputtering or a CVD method, as shown in FIG. 3A.

Figure 3B:
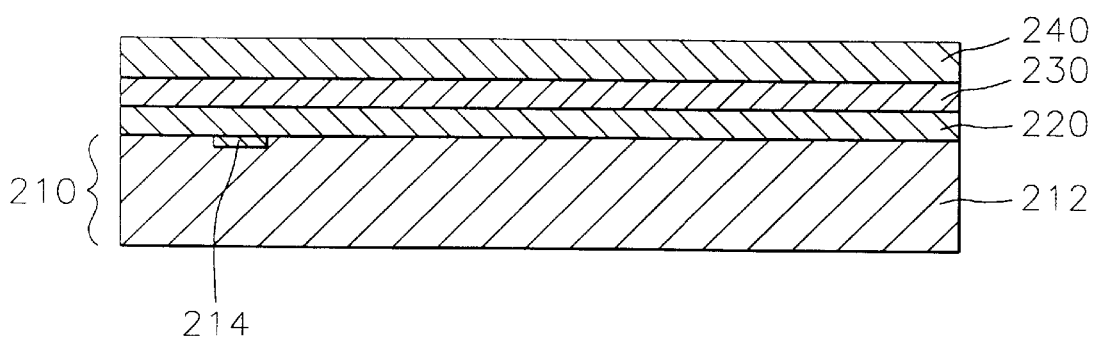

In a ensuing step, there is formed on top of the etchant stopping layer 230 a thin film sacrificial layer 240, having a thickness of 0.1–2 μm, and made of a phosphor-silicate glass(PSG) by using, e.g., a CVD method or a spin coating method, as shown in FIG. 3B.

Figure 3C:
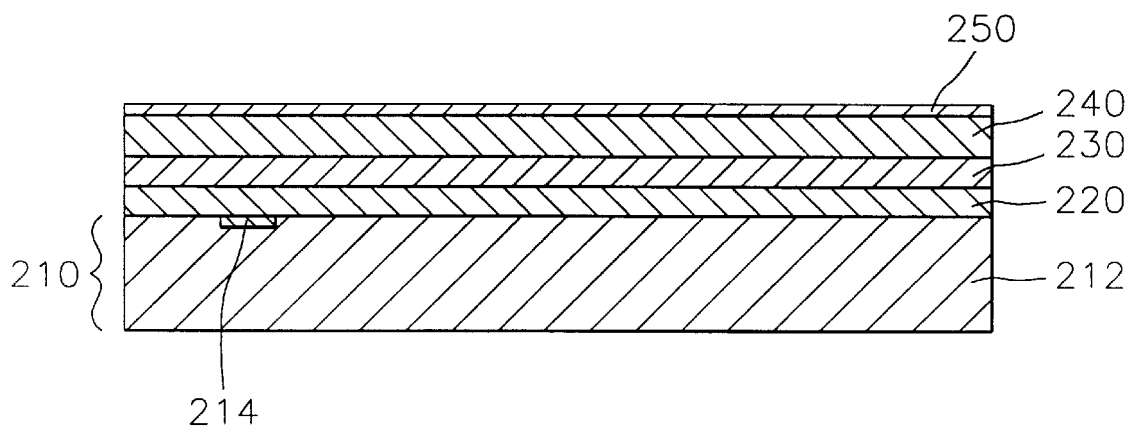

Thereafter, a protective oxidation layer 250, made of, e.g., a silicon oxide (Sio$_2$) or a silicon nitride (Si$_3$N$_4$), and having a thickness of 100–2000 Å, is deposited on top of the thin film sacrificial layer 240 by using a low-pressure chemical vapor deposition (LPCVD) method in a nitrogen atmosphere, as shown in FIG. 3C.

Figure 3D:
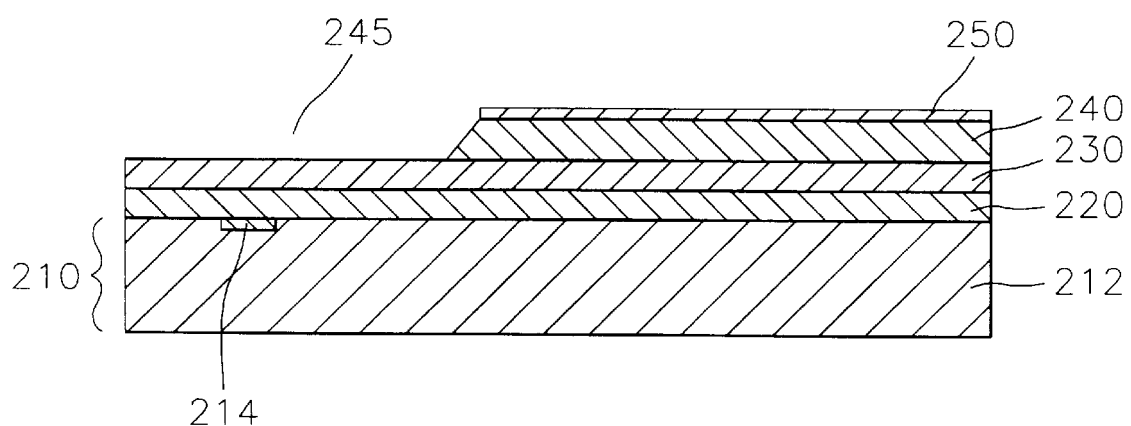

Thereafter, there is formed an array of M×N pairs of empty cavities 245 by using an wet etching method, as shown in FIG. 3D, wherein each of the empty cavities 245 is formed by: first forming a photoresist (not shown) on top of the protective oxidation layer 250; selectively removing the thin film sacrificial layer 240 and the protective oxidation layer 250 to thereby create an array of M×N empty cavities 245; and removing the photoresist. One of the empty cavities in each pair encompasses one of the connecting terminals 214.

Subsequently, an elastic layer 260, made of an insulating material, e.g., silicon nitride, and having a thickness of 0.1–2 μm, is deposited on top of the protective oxidation layer 250 including the empty cavities by using a CVD method.

Figure 3E:
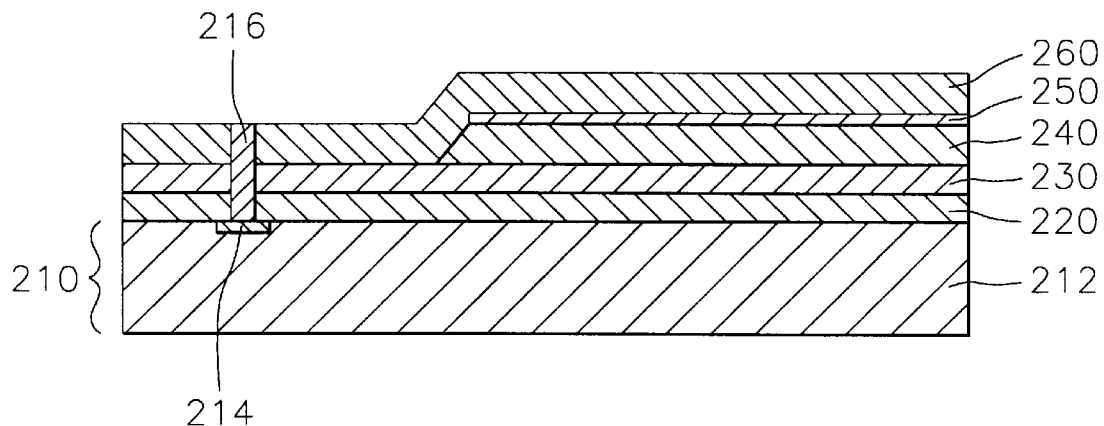

Thereafter, an array of M×N conduits 216 made of a metal, e.g., tungsten(W), is formed from top of the elastic layer 260 to top of each of connecting terminal 214, as shown in FIG. 3E.

Then, a second thin film layer 270, made of an electrically conducting material, e.g., aluminum(Al), and having a thickness of 0.1–2 μm, is formed on top of the elastic layer 260 including the conduits 216 by using a sputtering or a vacuum evaporation method.

Next, a thin film electrodisplacive layer 280, made of a piezoelectric material, e.g., lead zirconium titanate(PZT), or an electrostrictive material, e.g., lead magnesium niobate (PMN), and having a thickness of 0.1–2 μm, is formed on top of the second thin film layer 270 by using a CVD method, an evaporation method, a Sol-Gel method or a sputtering method.

Figure 3F:
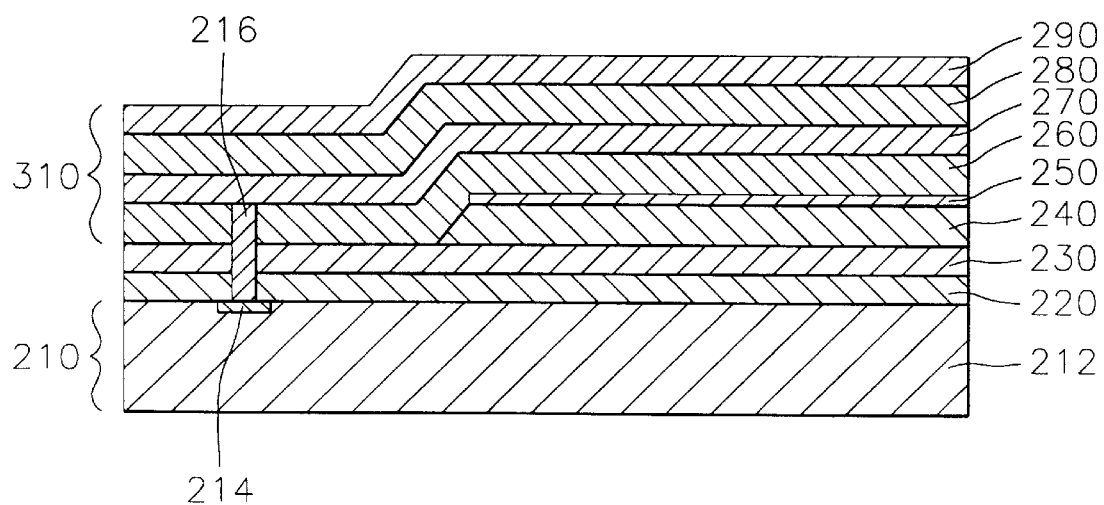

In an ensuing step, a first thin film layer 290, made of an electrically conducting and light reflecting material, e.g., aluminum(Al) or silver(Ag), and having a thickness of 0.1–2 μm, is formed on top of the thin film electrodisplacive layer 280 by using a sputtering or a vacuum evaporation method to thereby form a multiple layered structure 310, as shown in FIG. 3F.

Figure 3G:
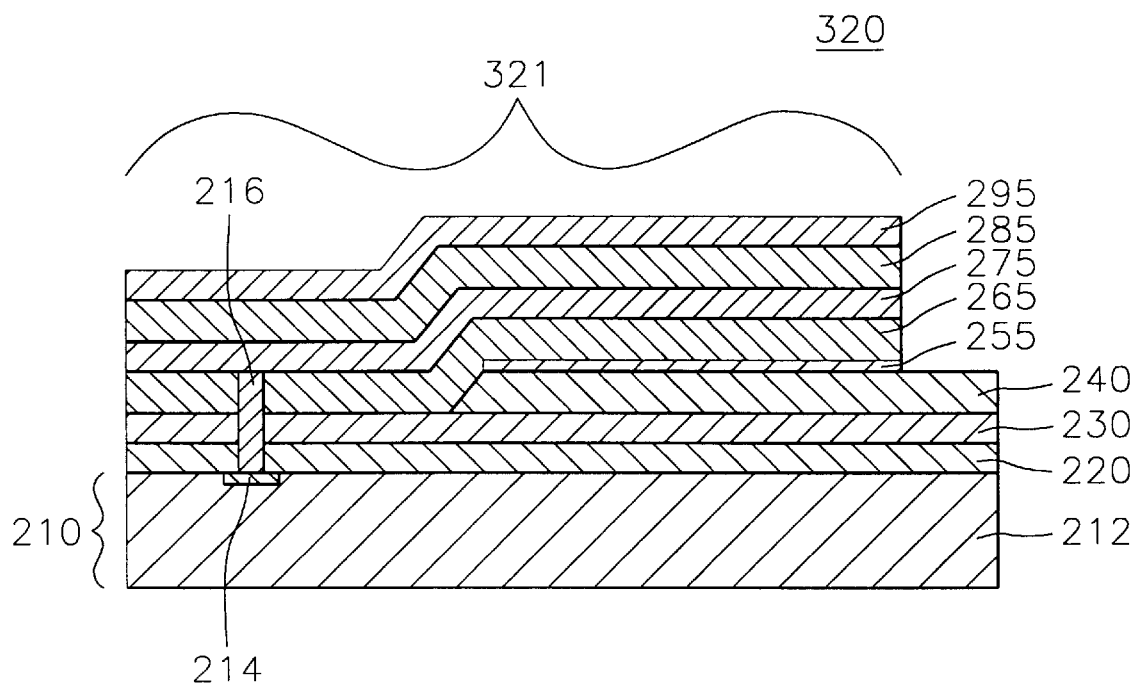

After the above step, the multiple layered structure 310 is patterned into an array 320 of M×N actuated mirror structure 321 by using a photolithography or a laser trimming method, until the thin film sacrificial layer 240 is exposed, each of actuated mirror structure 321 including a first thin film electrode 295, a thin film electrodisplacive member 285, a second thin film electrode 275, an elastic member 265 and a protective oxidation member, as shown in FIG. 3G.

Figure 3H:
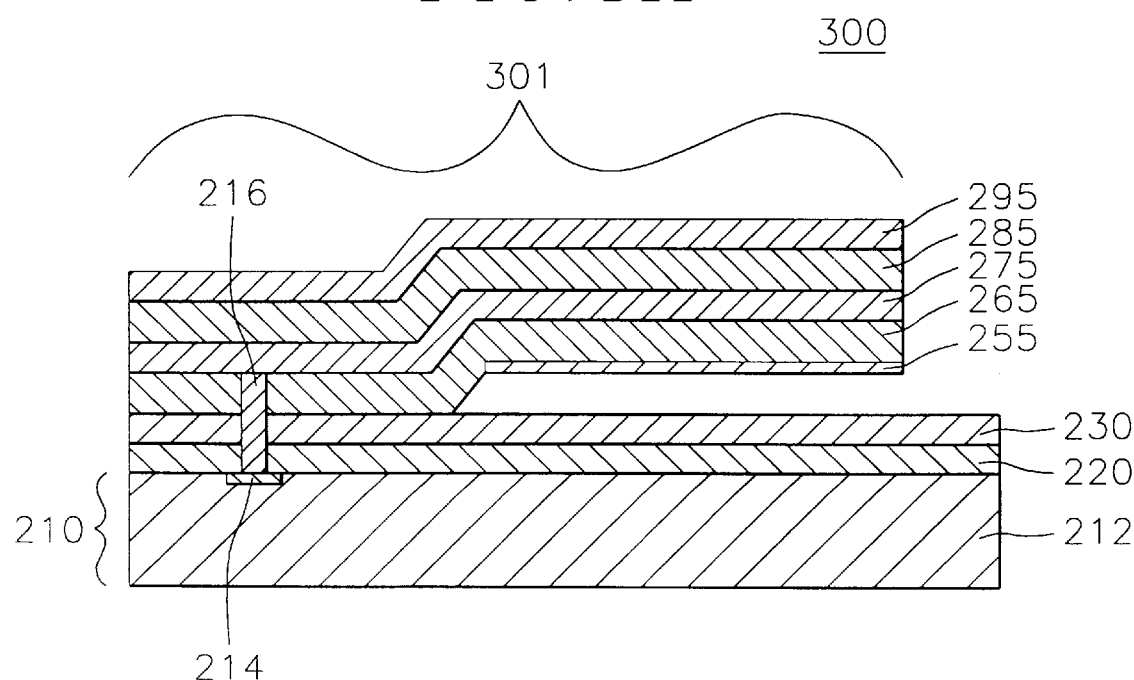

The thin film sacrificial layer 240 is then removed by using an etchant, e.g., hydrogen fluoride(HF) to thereby form the array 300 of M×N thin film actuated mirrors 301, as shown in FIG. 3H.

In contrast with the method for the manufacture of the array 100 of M×N thin film actuated mirrors 101 previously disclosed, in the inventive method, the protective oxidation layer 250 is deposited on top of the thin film sacrificial layer 240 before the formation of each of the empty cavities 245 in order to prevent phosphorus on the surface of thin film sacrificial layer 240 from getting oxidized.

While the present invention has been described with respect to certain preferred embodiments only, other modifications and variations may be made without departing from the spirit and scope of the present invention as set forth in the following claims.

What is claimed is:

1. An array of M×N thin film actuated mirrors for use in an optical projection system, the array comprising:

an active matrix including a substrate and an array of M×N connecting terminals;

a passivation layer formed on top of the active matrix;

an etchant stopping layer formed on top of the passivation layer; and an array of M×N actuated mirror structures, each of the actuated mirror structures including a first thin film electrode, a thin film electrodisplacive member, a second thin film electrode, an elastic member and a protective oxidation member, the thin film electrodisplacive member being located between the two electrodes, the protective oxidation member being located under the elastic member wherein each of the second thin film electrodes is electrically connected to a corresponding connecting terminal through a conduit, thereby functioning as a signal electrode in each of the thin film actuated mirrors and each of the first thin film electrodes functions as a mirror as well as a bias electrode therein.

2. A method for the manufacture of an array of M×N thin film actuated mirrors, wherein M and N are integers, for use in an optical projection system, the method comprising the steps of:

providing an active matrix including a substrate, an array of M×N connecting terminals and an array of M×N transistors;

forming a passivation layer and an etchant stopping layer on top of the active matrix, respectively;

depositing a thin film sacrificial layer on top of the etchant stopping layer;

depositing a protective oxidation layer on top of the thin film sacrificial layer;

creating an array of M×N pairs of empty cavities, one of the empty cavities in each pair encompassing one of the connecting terminals;

depositing an elastic layer on top of the protective oxidation layer including the empty cavities;

forming an array of M×N conduits, each of the conduits extending from top of the elastic layer to top of a corresponding connecting terminal;

depositing a second thin film, a thin film electrodisplacive and a first thin film layers, successively, on top of the elastic layer to thereby form a multiple layered structure;

patterning the multiple layered structure into an array of M×N actuated mirror structures until the thin film sacrificial layer is exposed, each of actuated mirror structures including a first thin film electrode, a thin film electrodisplacive member, a second thin film electrode, a elastic member and a protective oxidation member, respectively; and removing the thin film sacrificial layer thereby forming the array of M×N thin film actuated mirrors.

3. The method of claim 2, wherein the protective oxidation layer is made of a silicon oxide (SiO$_2$).

4. The method of claim 2, wherein the protective oxidation layer is made of a silicon nitride ($Si_3N_4$).

5. The method of claim 3, wherein the protective oxidation layer has a thickness of 100–2000 Å.

6. The method of claim 3, wherein the protective oxidation layer is deposited by using a low-pressure chemical vapor deposition (LPCVD) in a nitride atmosphere.

7. The method of claim 2, wherein each of the empty cavities is formed by:

forming a photoresist on top of the protective oxidation layer;

removing the thin film sacrificial layer and the protective oxidation layer by using a wet etching method, selectively; and removing the photoresist, completely.

8. The method of claim 4, wherein the protective oxidation layer has a thickness of 100–2000 Å.

9. The method of claim 4, wherein the protective oxidation layer is deposited by using a low-pressure chemical vapor deposition (LPCVD) in a nitride atmosphere.

* * * * *